United States Patent [19]

Muhs

[11] Patent Number: 5,627,934

[45] Date of Patent: May 6, 1997

[54] CONCENTRIC CORE OPTICAL FIBER WITH MULTIPLE-MODE SIGNAL TRANSMISSION

[75] Inventor: Jeffrey D. Muhs, Lenoir City, Tenn.

[73] Assignee: Martin Marietta Energy Systems, Inc., Oak Ridge, Tenn.

[21] Appl. No.: 285,246

[22] Filed: Aug. 3, 1994

[51] Int. Cl.$^6$ .................................................. G02B 6/22
[52] U.S. Cl. .......................................... 385/127; 385/12
[58] Field of Search ........................... 385/28, 29, 126, 385/127, 128, 12, 13

[56] References Cited

U.S. PATENT DOCUMENTS

| | | | |
|---|---|---|---|
| 4,000,416 | 12/1976 | Goell | 385/127 X |
| 4,070,091 | 1/1978 | Taylor et al. | 385/127 X |
| 4,252,403 | 2/1981 | Salisbury | 385/28 |
| 4,439,221 | 3/1984 | Smyth et al. | 65/378 |
| 4,770,492 | 9/1988 | Levin et al. | 385/13 |
| 4,830,461 | 5/1989 | Ishiharada et al. | 385/13 |
| 5,096,277 | 3/1992 | Kleinerman | 385/12 |
| 5,363,463 | 11/1994 | Kleinerman | 385/12 X |

FOREIGN PATENT DOCUMENTS

| | | | |
|---|---|---|---|
| 3042795 | 5/1982 | Germany | 385/127 |
| 2125179 | 2/1984 | United Kingdom | 385/127 |
| 2136239 | 9/1984 | United Kingdom | 385/127 |

*Primary Examiner*—John D. Lee
*Attorney, Agent, or Firm*—Earl L. Larcher; W. Mark Bielawski

[57] ABSTRACT

A concentric core optical fiber provides for the simultaneous but independent transmission of signals over a single optical fiber. The concentric optical fiber is constructed of a single-mode or multimode inner optical fiber defined by a core and a cladding of a lower index of refraction than the core and an outer optical fiber defined by additional cladding concentrically disposed around the cladding and of an index of refraction lower than the first mentioned cladding whereby the latter functions as the core of the outer optical fiber. By employing such an optical fiber construction with a single-mode inner core or optical fiber, highly sensitive interferometric and stable less sensitive amplitude based sensors can be placed along the same length of a concentric core optical fiber. Also, by employing the concentric core optical fiber secure telecommunications can be achieved via the inner optical fiber since an intrusion of the concentric optical fiber will first cause a variation in the light being transmitted through the outer optical fiber and this variation of light being used to trigger a suitable alarm indicative of the intrusion.

3 Claims, 2 Drawing Sheets

CONCENTRIC CORE OPTICAL FIBER WITH MULTIPLE-MODE SIGNAL TRANSMISSION

This invention was made with the support of the United States Government under contract No. DE-AC05-84OR21400 awarded by the U.S. Department of Energy. The United States Government has certain rights in this invention.

BACKGROUND OF THE INVENTION

The present invention relates generally to a multiple-core optical fiber arrangement with simultaneous independent single-mode or multimode and multimode transmission capabilities, and more particularly to such an optical fiber with a concentric core construction as provided by an inner single-mode or multimode optical fiber formed of a core encased in a cladding of a lower index or refraction and an outer multimode optical fiber provided by an additional cladding of yet a lower index of refraction concentrically disposed about the casing of the inner optical fiber whereby the cladding of the inner optical fiber functions as the core of the outer multimode optical fiber.

Optical fibers have been successfully utilized in sensor applications for detecting and measuring various physical parameters such as temperature, strain, moisture content, and the like. The optical fibers previously used for the detection and the measurement of such physical parameters were limited to the transmission of sensor signals with either a signal-mode or a multimode propagation. Thus, the multiplexing of various types of sensors such as highly sensitive, interferometric-based sensors with less sensitive, amplitude-based sensors on the same optical fiber has not been possible.

Optical fibers have also been increasingly used in signal transmission applications such as in telecommunications where the light signals are transmitted over long distances by employing single-mode optical fibers over shorter distances by using multimode optical fibers. While the use of single-mode and multimode optical fibers in the telecommunication field are of significance importance, the signals being transmitted through the previously known optical fibers can be surreptitiously extracted so as to compromise the security of the telecommunications.

SUMMARY OF THE INVENTION

It is a principal aim or objective of the present invention to provide an optical fiber having a concentric core construction whereby a single concentric core optical fiber can be used for simultaneously transmitting discrete multiple-modes as defined by an inner single-mode or multimode signal propagation along with an outer multimode signal propagation so as to permit the multiplexing of various type of sensors and signals on a single optical fiber. More specifically, the concentric core optical fiber of the present invention comprises first optical fiber means for signal transmission with single-mode or, alternatively, multimode propagation and second optical fiber means for signal transmission with multimode propagation. The first optical fiber means consists essentially of a first core concentrically encased in a first cladding with this cladding being provided with an index of refraction that is lower than the index of refraction of the first core. The second optical fiber means consists essentially of a second core defined by the cladding of the first optical fiber means and a second cladding which is concentrically disposed about the cladding of the first optical fiber means and which has an index of refraction that is lower than the index of refraction of the cladding of the first optical fiber means.

Another object of the present invention is to provide a concentric core optical fiber whereby two significantly different fiber optic sensors can be multiplexed on the same multiple-mode optical fiber so as to provide a measurement system capable of simultaneously monitoring more than one physical parameter or measuring the same parameter over different dynamic ranges. For example, with a single-mode inner optical fiber a highly sensitive strain sensor can be provided while an amplitude-based measurement of temperature, moisture, or the like can be simultaneously provided using the outer multicore optical fiber since the propagation of the two signals through the concentric core optical fiber are independent of one another.

A further object of the present invention is to provide a concentric core optical fiber for secure telecommunication applications whereby the communication signals can be transmitted through the inner optical fiber while alarm or sensor signals can be propagated through the outer optical fiber so that any attempt to surreptitiously retrieve the signal through the inner optical fiber will trigger a suitable sensor or alarm indicative of such an intrusion.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments of the concentric core optical fiber of the present invention have been chosen for the purpose of illustration and description. The preferred embodiments illustrated and the exemplary utilizations of the concentric core optical fiber are not intended to be exhaustive nor to limit the invention to the precise form of optical fiber shown or utilization thereof. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

Figure 1:
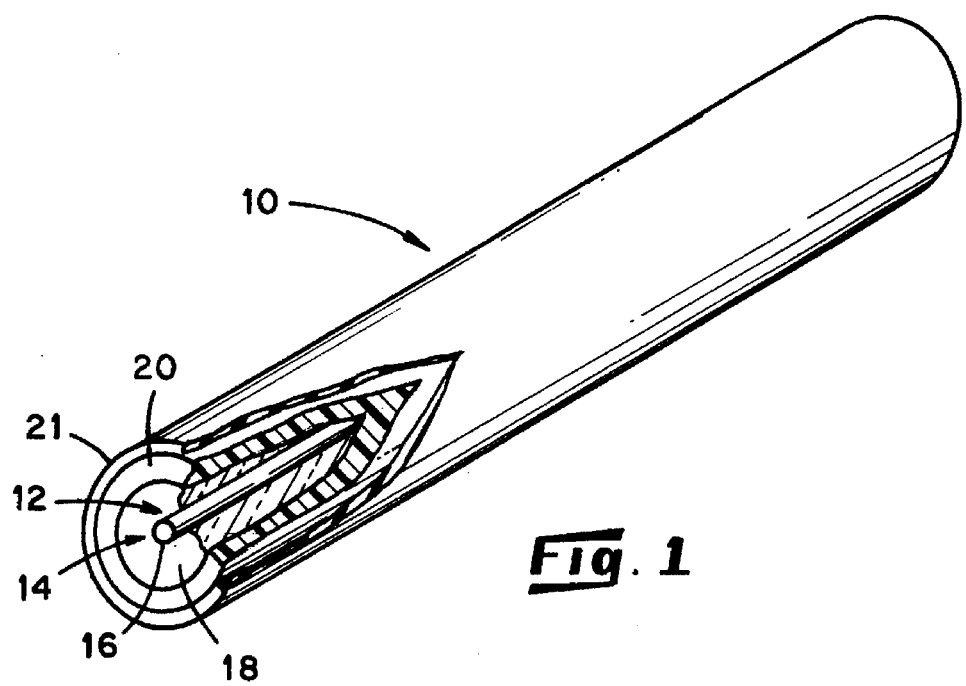
FIG. 1 is a perspective view, partially broken away view, of the multiple mode concentric core optical fiber of the present invention.

As briefly described above and as illustrated in FIG. 1, the present invention is directed to a concentric core optical fiber 10 provided by an inner single-mode or multimode, preferably single-mode, optical fiber 12 disposed in a concentric relationship with an outer multimode optical fiber 14. The inner single-mode or multimode optical fiber 12 is formed of a core 16 concentrically encased in a cladding 18. The multimode outer optical fiber 14 is formed of a core that is provided by the cladding 18 of the inner optical fiber 12 with this cladding/core 18 being concentrically encased in a further cladding 20. In order to provide for the desirable multiple-mode propagation of separate single-mode or multimode signals and multimode signals, the core 16 of the inner optical fiber 12 is provided with the highest index of refraction, the cladding/core 18 is provided with a lower or intermediate index of refraction, and the outer cladding 20 is provided with the lowest index of refraction. With this arrangement, relatively high bandwidth signals can be transmitted through the inner single-mode or multimode inner optical fiber 12 in a manner independent of the lower bandwidth, higher amplitude signals that are simultaneously transmitted through the outer multimode optical fiber 14.

The dielectric properties of the material used for the construction of the various constituents of the concentric core optical fiber 10 can be provided by employing any suitable material such as commonly used in the fabrication of optical fibers. Satisfactory materials include glass as used in the optical fibers described in U.S. Pat. No. 4,439,221, synthetic rubbers, preferably silicone rubber as the core material, as described in U.S. Pat. No. 4,830,461, or a suitable optically-clear plastic material as long as the refractive indices of the optical-fiber constituents are of a preselected decreasing magnitude from the inner optical fiber core 16 through the outer cladding 20. The concentric core optical fiber 10 is preferably covered in a buffer coating 21 formed of any suitable opaque material such as acrylic or any other suitable opaque plastic material for protecting the concentric core optical fiber 10 from receiving spurious light signals and from bending or being subjected to other stress-induced degradation.

In the preferred embodiment of the present invention the inner optical fiber 12 is a single-mode optical fiber with a glass core 16 of a diameter in the range of about 5 to 10 micrometers (μm) and with an index of refraction in the range of about 1.5 to about 1.47 (preferably 1.47) for the transmission of light signals in a frequency range of about 600 nanometers to about 1500 nanometers. The cladding/core 18 is formed of conventional optical-fiber construction materials including glass such as fused silica, plastic, or rubber and is of and inner diameter essentially corresponding to the outer diameter of the core 16 and an outer diameter in the range of about 100 to 200 μm (preferably 100 μm) with an index of refraction in the range of about 1.46 to 1.44 (preferably about 1.45). The cladding 20 of the outer multimode optical fiber 14 concentrically disposed about the cladding 18 of the inner optical fiber 12 is formed of a conventional cladding material such as optically-clear glasses, plastics, or rubber with an inner diameter essentially corresponding to the outer diameter of the cladding 18 and an outer diameter in the range of about 300 to 400 μm and with an index of refraction in the range of about 1.43 to about 1.40 μm (preferably 1.42 μn).

Figure 2:
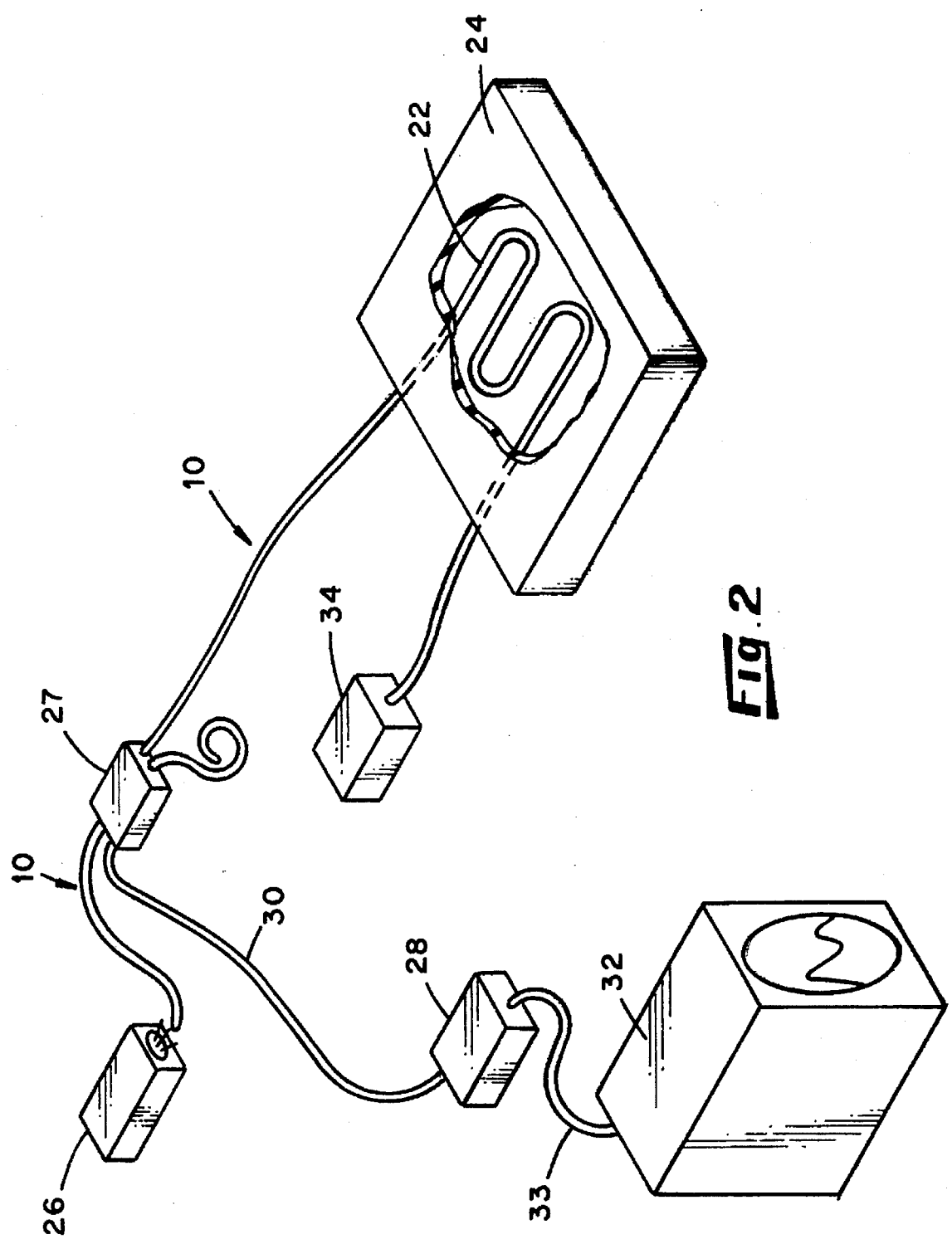
FIG. 2 is a schematic view of a sensor arrangement using the concentric core optical fiber of the present invention for the simultaneously measurement of physical parameters employing a single concentric core optical fiber.

With this combined single-mode and multimode optical fiber arrangement, highly sensitive sensors such as interferometric sensors and stable less sensitive, amplitude-based, sensors such as temperature or moisture sensors can be emplaced along a single concentric core optical fiber 10. For example, as illustrated in FIG. 2, simultaneous measurement of strain and temperature can be achieved using a common ultra violet (UV) laser light source for providing a light signal to a concentric core optical fiber 10 of the present invention which has a segment 22 thereof embedded in a suitable looped configuration within a base 24 formed of a cementitious or elastomeric material. In order to provide for temperature measurements of the base 24 an E-beam thermographic phosphor such as magnesium fluorogerminate or yttrium oxide is embedded in the cladding 20 of the outer optical fiber 14 for varying the amplitude and frequency of light transmission through the optical fiber 14 in response to temperature changes in the base 24. A single UV laser light source 26 is optically coupled to one end of the optical fiber 10 for the transmission of light at a frequency in the range of about 200 nanometers to about 500 nanometers to the segment 22 of the optical fiber 10 embedded in the base 22 through a fiber optic splitter 27 of any suitable previously known type that can be modified to split the signal from the inner optical fiber 12 in the embedded segment 22 of the optical fiber 10 into a detector 28 of any suitable type such as a conventional photodiode. This conveyance of the signal from the splitter 27 to the detector 28 may be provided by a conventional single-mode optical fiber 30. With this arrangement any strain such as a compression or tension loading imposed upon the base 24 will cause a corresponding strain on the embedded segment 22 of the optical fiber 10 and thus result in a change of frequency of the light signal passing through the inner single-mode optical fiber 12 in the embedded segment 22 of the concentric optical fiber 10 with this change in frequency of the light signal being detected and measured by the detector 28. The measurement of this change in signal and thus the strain imposed on the base 24 can be readily monitored by employing a recording mechanism such as a computer or a visual readout such as an oscilloscope generally shown at 32 which is coupled by line 33 to receive the signal from the detector 28.

To provide for sensing temperature changes occurring in the base 24, the end of the concentric core optical fiber 10 opposite the end thereof optically coupled to the laser 26 is connected to a detector 34 appropriately separated from the base 22. This detector 34 may be of a type similar to that of detector 28. A change in temperature occurring in the base 22 results in a corresponding change in frequency of the light transmitted through in the phosphor-laden outer optical fiber 14 in the embedded segment 22 of the concentric core optical fiber 10 with this change in frequency being readily sensed and measured at the detector 34 for providing a signal indicative of the change in temperature. This detector 34 may also be coupled to a suitable readout or recording device such as an oscilloscope or a computer (not shown).

Figure 3:
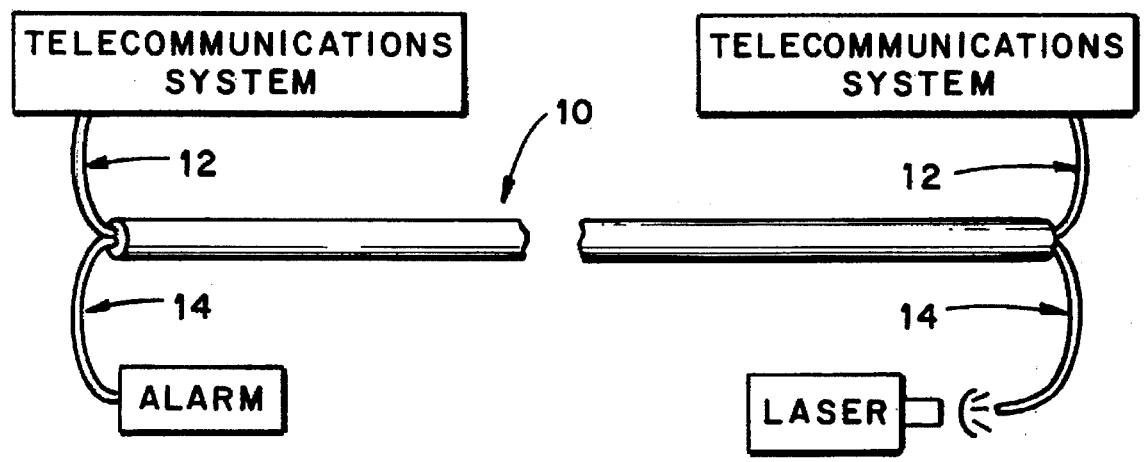
FIG. 3 is schematic view of an exemplary secure telecommunication arrangement utilizing the concentric core optical fiber of the present invention.

The preferred single-mode-multimode concentric core optical fiber 10 is also particularly suitable for telecommunication applications. In a typical telecommunication setup as generally illustrated in FIG. 3, data transmission is achieved by employing telecommunication systems using telephones, computers, and the like mechanisms which are capable of transmitting data in the form of light signals at a high frequency in the range of about 500 nanometers to about 1500 nanometers. Such telecommunication systems are generally shown at 36 and 38 coupled together by the concentric core optical fiber 10 of the present invention with the inner single-mode optical fiber 12 being used for this data signal transmission. The multimode outer optical fiber 14 of the concentric core optical fiber 10 is shown coupled at one end thereof to one or more sensors or alarms such as the alarm generally shown at 40. A laser light source 42 is coupled at the opposite end of the optical fiber 12 for transmitting a light signal through the optical fiber 14 at a frequency in the range of about 500 to 1300. With this arrangement any attempt to surreptitiously gather the information or data being transmitted through the inner single-mode optical fiber 12 of the concentric core optical fiber 10 as such as by tapping or a macrobend will first cause an encounter to be made with the light signal being transmitted through the outer multimode optical fiber 14 of the concentric core optical fiber 10. Such an intrusion would effectively change the amplitude of the light signal being transmitted through the outer multimode optical fiber 14 so as to trigger the alarm 40 or provide sensor readings indicative of an intrusion.

As pointed out above, the concentric core optical fiber of the present invention can be also constructed to provide simultaneous multimode signal propagation. In this embodiment of the present invention, the core 16 of the inner optical fiber is formed of glass, silicone rubber, or plastic, preferably glass or plastic, in a diameter in the range of about 50 to 200 μm and with an index of refraction in the range of about 1.5 to 1.47. The cladding/core 18 is formed of an optically-clear glass, plastic or rubber with an inner diameter substantially corresponding to the outer diameter of the core 16 and an outer diameter up to about 400 μm. This cladding/core 18 has an index of refraction in the range of about 1.46 to 1.44. The multimode outer optical fiber 14 of the concentric core optical fiber 10 as provided by the cladding/core 18 and an outer cladding 20 formed of glass, plastic or rubber with an inner diameter substantially corresponding to the outer diameter of the cladding/core 18 and an outer diameter up to about 600 μm. This cladding has index of refraction in the range of about 1.43 to 1.40.

With this multimode-multimode optical fiber arrangement, optical fiber sensors such as those based or relatively high amplitude signals as used for sensing and measuring various physical parameters including moisture content, temperature changes, and the like can be multiplexed on a single concentric core optical fiber 10. Also, such a multimode-multimode optical fiber 10 can be used in secure telecommunications over fairly short distances by employing an arrangement such as shown in FIG. 3.

It will also be seen that with the concentric core optical fiber 10 of the present invention light signals from two independent laser sources can be simultaneously transmitted via the single-mode or multimode inner core 12 and the multimode outer core 14 for permitting the simultaneous utilization of two totally independent sensors on the same optical fiber.

What is claimed is:

1. An optical fiber sensor system for providing simultaneous signals indicative of any change in different conditions occurring in a single body and comprising a concentric core optical fiber assembly with a first sensor means and a second sensor means supported by said body and with said second sensor mean being less sensitive to the changes in the different conditions than said first sensor means, said optical fiber sensor system consisting of first and second concentrically disposed optical fiber means, a single light source means coupled to a common end of said first and said second optical fiber means for simultaneously transmitting a first light signal at a selected frequency through the first optical fiber means and a second light signal at said selected frequency through the second optical fiber means, first detector means coupled to a region of said first optical fiber means spaced from said common end for detecting and measuring any changes in the frequency of the first light signal from said selected frequency transmitted therethrough independent of any light signal being transmitted through the second optical fiber means, and second detector means coupled to a region of said second optical fiber means spaced from said common end for detecting and measuring any changes in the frequency of the second light signal from said frequency transmitted therethrough independent of any light signal being transmitted through the first optical fiber means, said first optical fiber means having an elongated region thereof defining the first sensor means and consisting essentially of a first core with a first index of refraction and a first cladding concentrically disposed about the first core and having a second index of refraction that is lower than the index of refraction of the first core for the transmission of said first light signal at said selected frequency through the first sensor means with any change in the frequency of the first light signal to a frequency different from said selected frequency for reception by said first detector means being in response to a change in a first condition in the body supporting the first and second sensor means with the extent of the change in the frequency from said selected frequency providing a measurement indicative of the extent of the change in the first condition in said body, and said second optical fiber means consisting essentially of a second core defined by said first cladding and a second cladding concentrically disposed about said first cladding and having a third index of refraction lower than the index of refraction of the first cladding, said second optical fiber means having an elongated region substantially co-linear with the elongated region of the first optical fiber means and define, rig the second sensor means for the transmission of said second light signal at said selected frequency through the second sensor means with any change in said selected frequency of the second light signal to a frequency different from said selected frequency for reception by said second detector means being in response to a change in a second condition in said body with the extent of the change in the frequency from said selected frequency providing a measurement indicative of the extent of the change in the second condition in said body.

2. An optical fiber sensor system for providing simultaneous signals indicative of different conditions or changes occurring in a single body as claimed in claim 1, wherein said first condition in said body is defined by a strain imposed upon said body, and wherein the extent of change in frequency of the first light signal from said selected frequency corresponds to the extent of strain imposed on said body.

3. An optical fiber sensor system for providing simultaneous signals indicative of different conditions or changes occurring in a single body as claimed in claim 2, wherein said second cladding contains an E-beam thermographic phosphor, wherein said second condition is defined by a change in the temperature of said body, and wherein the extent of change in the frequency of said second light signal from the selected frequency corresponds to said extent of the change in the temperature of said body.

* * * * *